US009834325B2

United States Patent
Ramaska

(10) Patent No.: US 9,834,325 B2
(45) Date of Patent: *Dec. 5, 2017

(54) SYMMETRICAL CONTINUOUS MULTIDIRECTIONAL ULTRA-LIGHT ULTRA-STRONG STRUCTURE

(71) Applicant: Mindaugas Ramaska, Klaipeda (LT)

(72) Inventor: Mindaugas Ramaska, Klaipeda (LT)

( * ) Notice: Subject to any disclaimer, the term of this patent is extended or adjusted under 35 U.S.C. 154(b) by 0 days.

This patent is subject to a terminal disclaimer.

(21) Appl. No.: 15/165,838

(22) Filed: May 26, 2016

(65) Prior Publication Data

US 2016/0376783 A1    Dec. 29, 2016

Related U.S. Application Data

(63) Continuation-in-part of application No. 14/851,595, filed on Sep. 11, 2015, now Pat. No. 9,353,909.

(Continued)

(51) Int. Cl.

| | |
|---|---|
| *E04H 12/00* | (2006.01) |
| *B64G 1/22* | (2006.01) |
| *B62D 25/00* | (2006.01) |
| *B64C 1/00* | (2006.01) |
| *B61D 17/00* | (2006.01) |
| *B63B 17/00* | (2006.01) |
| *B62D 21/00* | (2006.01) |
| *B62D 21/15* | (2006.01) |
| *B62D 21/18* | (2006.01) |

(Continued)

(52) U.S. Cl.
CPC ............. *B64G 1/22* (2013.01); *B61D 17/00* (2013.01); *B62D 21/00* (2013.01); *B62D 21/15* (2013.01); *B62D 21/183* (2013.01); *B62D 25/00* (2013.01); *B63B 3/12* (2013.01); *B63B 5/24* (2013.01); *B63B 17/0081* (2013.01); *B64C 1/00* (2013.01); *B64C 1/062* (2013.01)

(58) Field of Classification Search
CPC ........... E04B 1/1906; E04B 2001/1927; E04B 2001/1957; B62D 25/00; B64C 1/00; B61D 17/00; B64G 1/22; B63B 3/00
USPC ........... 52/653.1, 652.1, 656.1; 403/170, 171
See application file for complete search history.

(56) References Cited

U.S. PATENT DOCUMENTS 3,220,152 A    11/1965  Sturm
3,722,153 A *  3/1973   Baer ........................ E04B 1/32
                                                        403/176

(Continued)

FOREIGN PATENT DOCUMENTS

WO    2010016974 A1    2/2010
WO    2014006422 A2    1/2014

OTHER PUBLICATIONS

J.L. Meriam, et al., "Engineering Mechanics Statics—Seventh Edition" Virginia Polytechnic Institute and State University; John Wiley & Sons, Inc.; 1978.

*Primary Examiner* — Basil Katcheves
(74) *Attorney, Agent, or Firm* — St. Onge Steward Johnston and Reens LLC

(57) ABSTRACT

A multidimensional structures that is formed of thirty six interconnecting members in such a manner as to form eight (8) tetrahedrons and six (6) octahedrons thereby providing a structure that is both light weight and strong, the interconnecting members variously intersecting at a central point that may be formed of a single unified structure having fillets in the middle of the multidimensional structure and at twelve (12) external connecting points.

15 Claims, 19 Drawing Sheets

Related U.S. Application Data

(60) Provisional application No. 62/163,814, filed on May 19, 2015, provisional application No. 62/156,616, filed on May 4, 2015.

(51) Int. Cl.
*B64C 1/06* (2006.01)
*B63B 3/12* (2006.01)
*B63B 5/24* (2006.01)

(56) References Cited

U.S. PATENT DOCUMENTS

| | | | |
|---|---|---|---|
| 3,913,105 A | 10/1975 | Williamson et al. | |
| 3,974,600 A * | 8/1976 | Pearce | E04B 1/32 52/236.1 |
| 4,207,715 A * | 6/1980 | Kitrick | E04B 1/19 428/542.2 |
| 4,337,560 A | 7/1982 | Slysh | |
| 4,381,636 A * | 5/1983 | Sapp | E04B 1/19 403/171 |
| 4,551,726 A * | 11/1985 | Berg | H01Q 15/18 342/7 |
| 4,719,726 A * | 1/1988 | Bergman | E04B 1/3211 52/81.4 |
| 4,930,930 A * | 6/1990 | Coppa | E04B 1/1909 403/170 |
| 5,331,779 A * | 7/1994 | Hing | E04H 1/04 52/236.2 |
| 7,694,463 B2 * | 4/2010 | Lanahan | E04B 1/19 446/118 |
| 8,511,685 B2 * | 8/2013 | Goldman | A63F 9/1208 273/153 R |
| 9,353,909 B2 * | 5/2016 | Ramaska | B62D 21/00 |
| 2009/0145073 A1 * | 6/2009 | Takeshima | E04B 1/18 52/653.1 |
| 2012/0112479 A1 * | 5/2012 | Nagwanshi | B60R 19/34 293/133 |

* cited by examiner

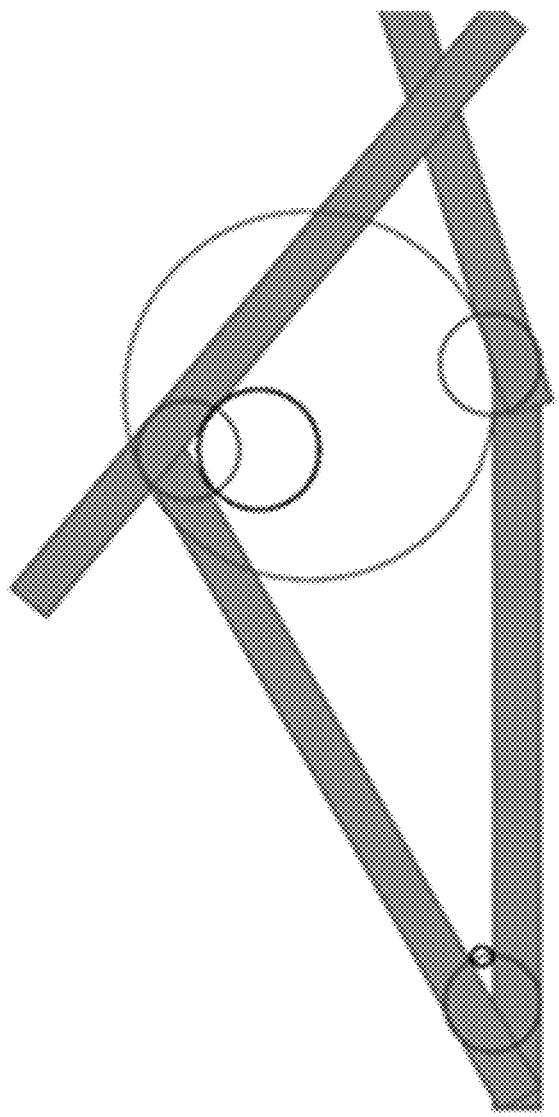

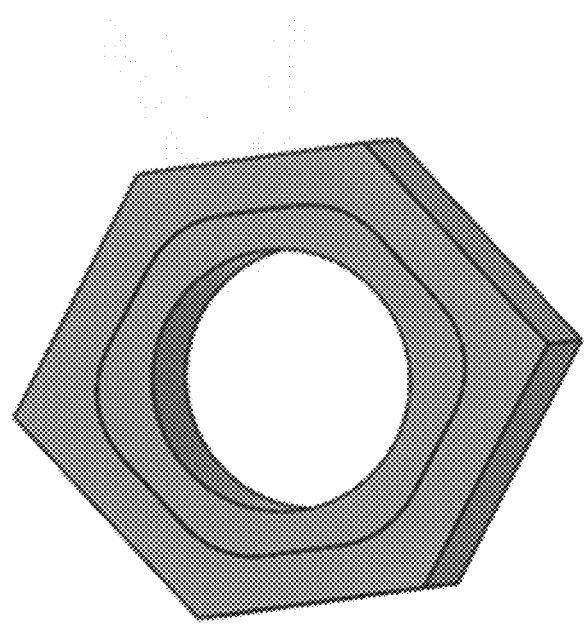
Figure 8B

SYMMETRICAL CONTINUOUS MULTIDIRECTIONAL ULTRA-LIGHT ULTRA-STRONG STRUCTURE

FIELD OF THE INVENTION

A multidirectional (three dimensional) structure that is lightweight and provides for energy absorption with relatively little displacement and high anti-vibration capabilities. More particularly, the multidirectional structure uses a novel combination of tetrahedrons and octahedrons that provides for increased anti-bending, buckling, compression, tension, torque, and yield strength for applied forces from any direction.

BACKGROUND OF THE INVENTION

The search for both light-weight and strong structures has been ongoing for many centuries. Known support structures come in different shapes and forms with some providing certain strength and weight advantages. However, the strength and weight advantages of known structures typically come with a heavy price tag; that is, the increased strength and lower weight of the structure in certain aspects of the structure are obtained by lowering the strength in other aspects of the structure. These tradeoffs typically limit the applications of known structures, or require modifications or duplications that function to increase weight of the structure.

In performing research for a new vehicle, the issue of energy efficiency is of paramount concern. Key features include an aerodynamic design for high speed with a low rolling resistance, meaning the need for a relatively small down force (e.g., low mass). The desire was for a vehicle that could travel faster than 100 km/h with a weight of less than 24 kg. With such a low weight, however, safety concerns were raised for passengers if the vehicle were to strike a non-moving object. The need then for an ultra-light weight yet very strong structure was needed.

Existing space truss structures are often based on plane truss structure that is not optimal for space truss structure. Plane truss structures such as Pratt, Howe, Warren, Baltimore and Fink (J. L. Meriam, L. G. Kriage, "Engineering Mechanics STATICS", #5 Chapters 3 and 4, published by Wiley, 2003) have inefficient bar lengths especially if beam diameter is the same throughout the structure. Non optimized beam diameter can unnecessarily increase the mass of the structure or result in a weakened structure. A misplaced beam can cause the structure to be unbalanced providing weak or redundant structural points.

Many known structures are based on designs that incorporate rectangular supporting shapes that are easy to build, but do not have good interconnection of the beams. Alternatively, more advanced structures use triangular shapes for reinforcing the structure. These two-dimensional ("2D") elements are typically not connected in a pattern or bar length that is optimal. Likewise, the connections that are utilized typically do not achieve optimal peak performance.

A W-shaped (corrugated) structure 10 as illustrated in FIG. 1 is known and generally provides effective strength characteristics in two directions (i.e., in X-Y-Z rectangular coordinates, it is strong if the force vector is in the Y and Z axes, but it is weak if the force vectors are in the X axis direction). So while the W-shaped structure 10 provides good 2D strength characteristics, it presents very poor three-dimensional ("3D") strength characteristics. Accordingly, the W-shaped structure 10 has more of a tendency to buckle because of the relatively thin walls and has a double buckling direction, which make this structure a good single energy absorber, but not usable for dynamic loads.

There are known 3D structures, however, many of the 3D "lightweight" structures have weaknesses that severely limit their use. One example of a structure that utilizes a tetrahedron is disclosed in U.S. Pat. No. 3,220,152 entitled, "Truss Structure" by R. G. Sturm ("the '152 patent"). However, while the '152 patent does disclose multi-directional connections as illustrated in FIG. 3, the disclosure is limited to simple triangular interconnections, such that the anti-buckling characteristics of the structure are not optimized, which again limits the effectiveness of the structure.

Another known design is the "honeycomb" structure 20 as illustrated in FIG. 2. While this design does provide for a relatively strong structure, the strength characteristics are not equally multidirectional. In other words, the structure is not equally strong in each of the X, Y and Z axes. Additionally, another drawback to the honeycomb structure 20 is that it is too heavy for its volume to be considered light weight, which also functions to limit its use.

Another known structure is the Icosahedron, which is a polyhedron with twenty faces or sides. However, the Icosahedron can only be provided as a single piece and therefore cannot be provided as a continuous structure.

So then, the various issues faced with known structures are that they are typically designed to be strong for a specific force vector, meaning that they function well in one axis but not in another different axis. Such structures are not multidirectional and therefore have limited use. Additionally, known structures are often made with many different length and diameter beams thereby making production complex.

SUMMARY OF THE INVENTION

What is needed then is a multidirectional structure that is relatively light and strong, while at the same time allows for a continuous structure.

It is further desired to provide a multidirectional structure that provides a light structure while simultaneously provides a relatively strong structure for forces applied in any of the X-axis, the Y-axis and/or the Z-axis, as well as rotation around X, Y, Z axis to account for multidirectional loading.

It is further desired to provide a multidirectional structure that may be used in many differing applications to provide a continuous ultra-light and ultra-strong truss structure.

A continuous lighter and stronger multidirectional structure is therefore provided comprising a novel combination of tetrahedrons and octahedrons in a manner that is previously not known. The novel combination allows for a lightweight design, and increased resistance to: bending, buckling, compression, tension, and/or torque. The novel combination further provides for increased yield strength and stress shearing. Some applications include, for example, supporting arcs, filling material, and beams inside a structure. The novel combination also shows very good performance in handling force applied to the structure from any direction, and will be easy to apply in industry.

A single unit or structure is a symmetrical cuboctahedron space truss structure composed of tetrahedrons and octahedrons with optimized beam lengths in cross-section. The novel structure includes a 3D structure of tetrahedrons and square pyramids with a central connection point having 12 beams; and the central connection point being part of eight (8) tetrahedrons and six (6) octahedrons, with the exterior comprising 24 edges and the entire structure comprising thirty six (36) identical beams. In essence, the novel structure can be considered to comprise three different symmetrical isohedrons including: 1 cuboctahedron; 8 Tetrahedrons; 6 Half octahedrons. The novel structure is defined by: 38 faces that comprise 14 external faces (8 triangles and 6 squares) and 24 internal triangle faces. Likewise, the novel structure comprises 13 vertexes that are all equally spaced from each other. The combination of features shows good energy absorption, high degree of safety, small displacement, high anti-vibration capabilities for the mass and space it takes. The fillet is applied and specifically designed to the intersection of beams to release the stress concentration. The fillets depend on the diameter of the beams and the angle between the connected beams.

One goal of the novel structure is to achieve an isotropic structure. Because of the geometry of the novel structure, every beam is affected by the other and effectively distribute loading. When force is applied, the resulting stress is distributed over all the beams in the structure instead of concentrating on only a few beams or even on one beam.

The structure described herein differs significantly from the truss structure described in the '152 patent. In the novel structure buckling was considered as a primary factor driving the design and therefore, the resultant structure provides for greatly increased resistance to such. Additionally, the novel structure does not utilize circular tubes for the beams and uses a single piece structure achieving superior connection points.

In one example, the interconnecting beams are provided with non-circular cross-section (e.g., triangular, irregular hexagon, etc.).

Still further, to enhance the lightweight aspect of the structure, the inside of the interconnecting beams may be provided hollow. In an example, the interconnecting beams are provided with different cross-sectional thicknesses. For example, a thinner wall is used to enhance the tetrahedron shape, while a thicker wall is used to enhance the octahedron shape. In one example, the interior cross-section may present an arc (e.g., may be circular) using two different hollow beam wall formulas (due to the fact that the exterior cross section is not an arc), the first formula for the tetrahedron interconnecting beams and the second formula for the octahedron interconnecting beams. It should be understood that tension across the structure is optimized and does not depend on the direction of the load. This is because the length of the beams and the cross-sections will be almost identical no matter which direction tension or compression is applied to the structure.

The material selected for constructing the novel structure should exhibit lightweight characteristics as well as being strong with the ability to bend rather than break. Additionally, it is highly desirable for the material to have a high coefficient of deformation such that the material tends to come back to its original position from displacement after loading.

It is contemplated that the novel structure may be used as either an inside support structure (e.g., surrounded with other objects), or as the structure itself (e.g., it is in open space and no other objects are surrounded its surface). It is contemplated that as an inside structure, this design could be used in a vehicle design, whether the vehicle is any of: a car/truck, or an aircraft/spacecraft, or a boat/ship, or train or any other moving object for transporting goods or people. The light-weight design combined with high-strength make it idea for use with a moving vehicle to allow for maximum efficiency with respect to energy consumption.

Due to the design of the novel structure, there are twelve (12) directions of how it can be constructed, which allows for it to be formed in any untraditional space and still function to its high capabilities. Additionally, due to the particular structural design, each beam in the novel structure bears stress regardless of where the stress bears on the structure.

For this application the following terms and definitions shall apply:

The terms "first" and "second" are used to distinguish one element, set, data, object or thing from another, and are not used to designate relative position or arrangement in time.

In one example, a multidimensional structure is provided comprising a total of thirty six interconnecting members each having first and second ends, said interconnecting members forming a total of thirteen connection points, the interconnecting members formed as twelve interior interconnecting members and twenty four exterior interconnecting members. The multidimensional structure further comprises a center connection point connecting first ends of the interior interconnecting members, and twelve exterior connection points, each exterior connection point connecting second ends of the interior interconnecting members with four ends of the exterior interconnecting members for forming the multidimensional structure.

In another example, a multidimensional structure is provided comprising a total of thirty six members each having first and second ends, said members formed as twelve interior members and twenty four exterior members. The multidimensional structure includes a central connection for joining first ends of the interior members and twelve exterior connections, each exterior connection joining second ends of the interior members with ends of four of the exterior members forming the multidimensional structure.

Other objects of the invention and its particular features and advantages will become more apparent from consideration of the following drawings and accompanying detailed description.

BRIEF DESCRIPTION OF THE DRAWINGS

FIG. 7 is an illustration showing arc patterns and angles.

FIGS. 8A and 8B illustrate an anti-slide/spin device for use with the multidimensional structure according to FIG. 3.

DETAILED DESCRIPTION OF THE INVENTION

Figure 1:
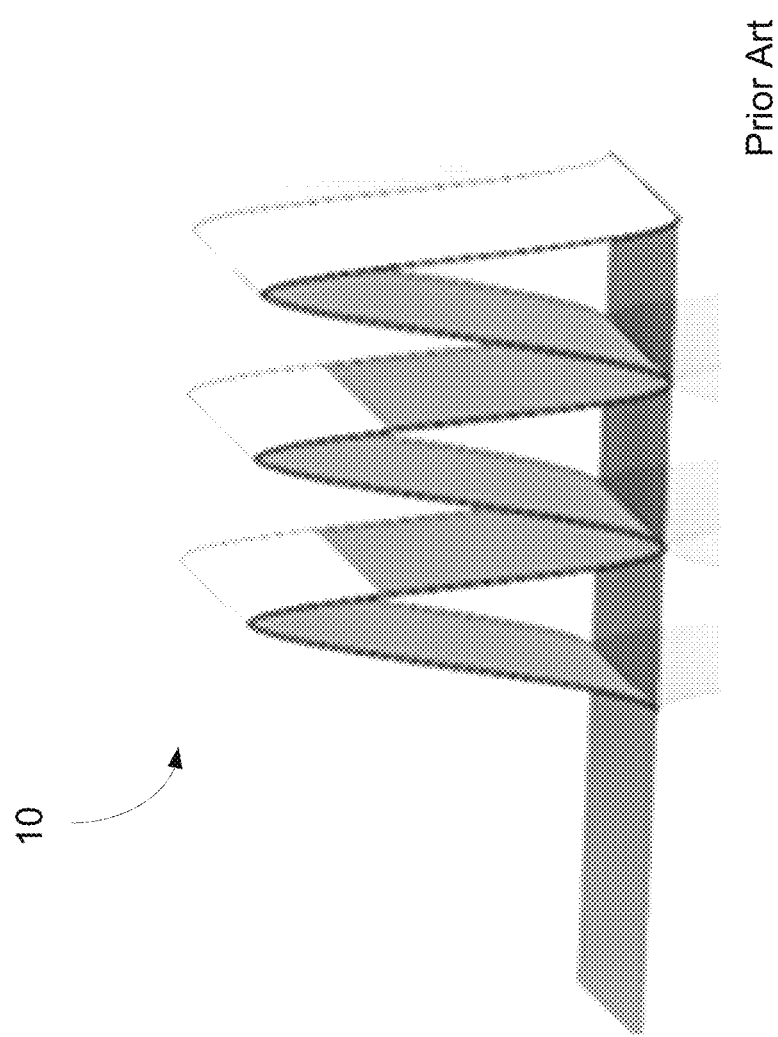
FIG. 1 is an illustration of a W-shaped structure according to the prior art.

Referring now to the drawings, wherein like reference numerals designate corresponding structure throughout the views.

A popular W-shape structure 10 is illustrated in FIG. 1, which has a tendency to buckle due to the fact that the structure 10 has relatively thin walls and has a double buckling direction. While this structure a good single energy absorber, it is not usable for dynamic loading. See, Table 1. This structure 10 is ultra-light and considering a volume of 8,000 cm³ it only takes 2.54% of space. This structure can withstand a maximum static load of 83,700 kg before breaking apart. Making this structure 1% of material space effectiveness on static load to be 32,953 kg.

Figure 3:
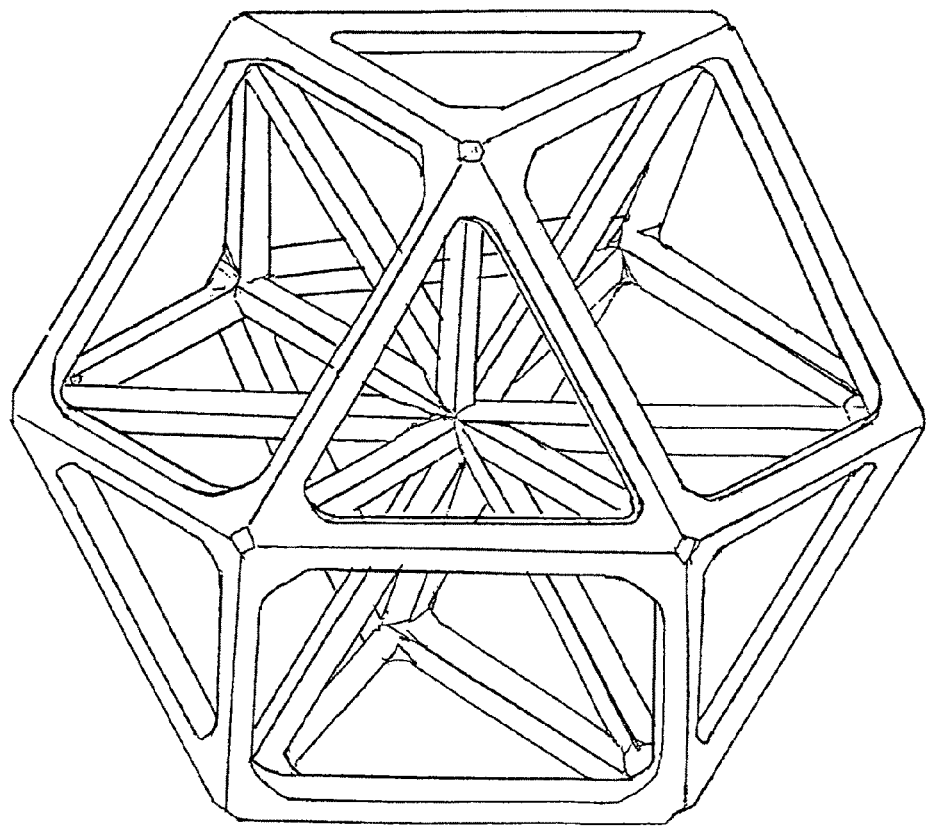
FIG. 3 is an illustration of the multidimensional structure according to the invention.

Alternatively, the multidimensional structure 100 shown in FIG. 3, which is also named by the inventor as "Katsuga" differs from other known truss structures. First, the multidimensional structure 100 considers buckling the main structure driven factor because at ultimate force the structure failure is due to the beams bending. Second, the multidimensional structure 100 does not utilize circular tubes or beams. Rather, it utilizes irregular hexagon hollow beams that provide better inertia over weight. Third, the multidimensional structure 100 does not use complex mechanical connection type joints that are relatively "heavy" and less effective. Rather, it uses single piece construction to achieve the lightest and strongest connection points.

A secondary factor, like tension, is also optimized by the structure. The multidimensional structure 100 can be cut into twenty four (24) different directions and still exhibit perfect tension capabilities, while the same can be said for both compression and rotation.

Figure 2:
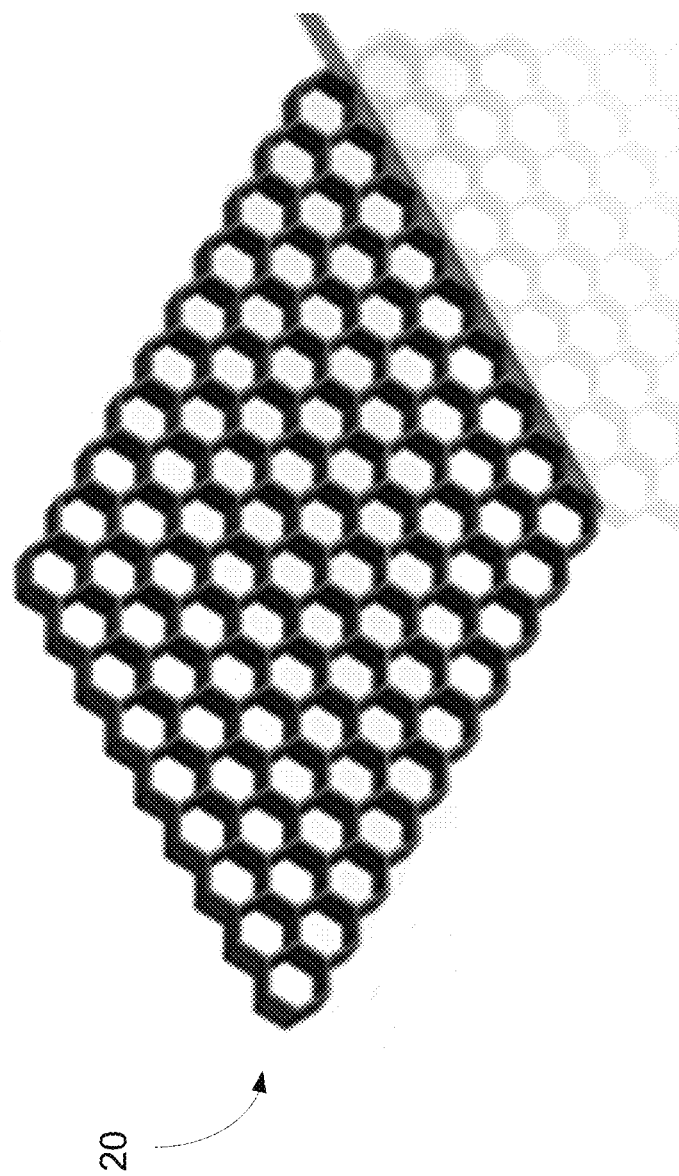
FIG. 2 is an illustration of a honeycomb shaped structure according to the prior art.

A standard honeycomb structure 20 (FIG. 2) was recreated and compared to the multidimensional structure 100. The results are provided in the table below. The honeycomb is 17 times heavier than the multidimensional structure 100. In an 8,000 cm³ structure, the honeycomb configuration consumes 24% of its space. This structure can withstand a total maximum 102,300 Kg of static load before breaking apart. Thus, making this structure 1% of materials maximum load in given space effectiveness on a static load to be 4,263 Kg.

The other popular shape, corrugated structure, has more of a tendency to buckle because of the relatively thin walls and has a double buckling direction. The corrugated structure is a good single energy absorber, but is not usable with dynamic loads. This structure is ultra-light weight and considering an 8,000 cm³ structure, takes up only 2.54% of space. This structure can withstand a maximum static load of 83,700 Kg before breaking apart. This makes this structure 1% of materials maximum load in given space effectiveness on static load to be 32,953 Kg.

Alternatively, the multidimensional structure 100 has good dynamic energy absorption capabilities, can withstand high static loading and impact load as well. This is because the multidimensional structure 100 is designed to have symmetric elastic displacement. This structure is ultra-light light weight and in a volume of 8,000 cm³ it only takes 3.6% of space. The multidimensional structure 100 can withstand a maximum static load of 327,360 kg before breaking apart, making this structure 1% of material space effectiveness on static load to be 90,933 kg.

Figure 5:
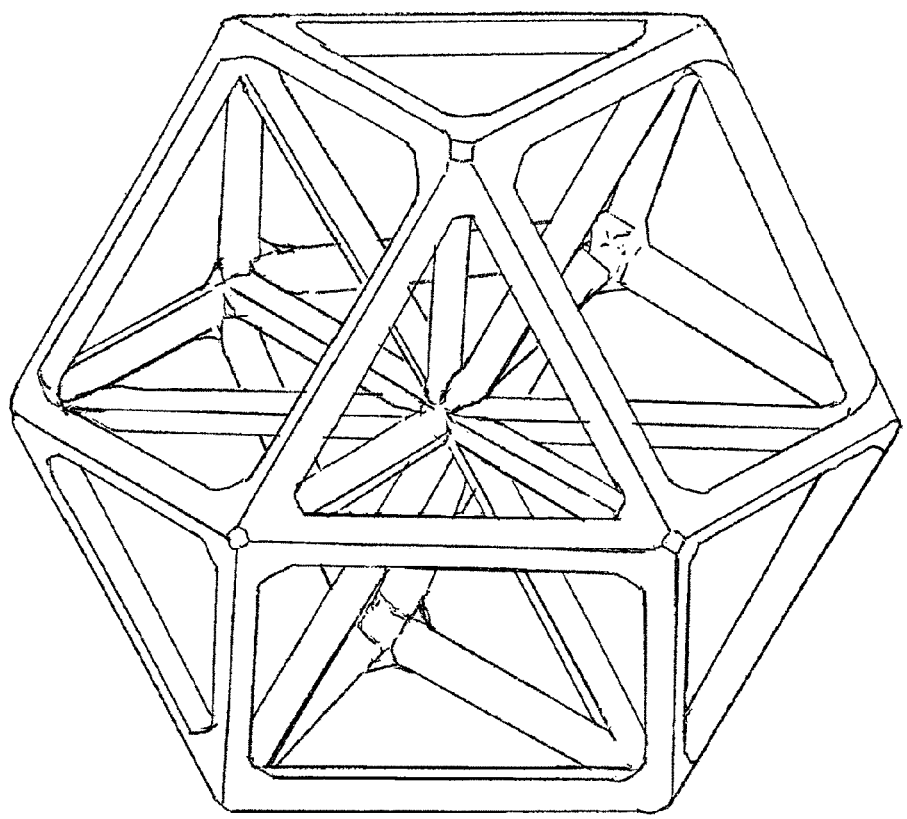
FIG. 5 is an illustration of the multidimensional structure according to FIG. 3.

The comparisons between three structures, corrugated structure 10 (FIG. 1), Honeycomb structure 20 (FIG. 2) and the multidimensional structure 100 (FIGS. 3 & 5) are provided in Table 1, including testing with 1,860 Kg compressive load and using Ti-6AL-4V alloy by Finite element analysis. The volume is 20×20×20 cm³ for every structure.

TABLE 1

| Volume 20 × 20 × 20 cm | Mass of volume | Factor Of Safety | Maximum static load Kg. | 1% of mass space static load Kg. |
|---|---|---|---|---|
| Honeycomb | 24% | 55 | 102,300 | 4,263 |
| Corrugated | 2.54% | 45 | 83,700 | 32,953 |
| "Katsuga" | 3.60% | 176 | 327,360 | 90,933 |

The multidimensional structure 100 is suitable for dynamic and static loads, exhibits high anti-vibration capabilities, is very strong, presents relatively small elastic displacement, is ultra-light weight, and is continuous and symmetrical.

The multidimensional structure 100 performance is dependent on its beam element length (L), inertia (I), beam connection type (K), material elasticity (E) and critical buckle point (Pct).

Pct is a load at which the beam will buckle and may be calculated with the following Equation 1:

$$P_{ct} = \frac{\pi^2 EI}{K(L^2)} \qquad \text{Equation 1}$$

By comparing the inertia of the cross-sections on a solid beam of aluminum 2014-T6 alloy, it was found that it has different performances with effects in bulking and length (L) over diameter (D) ratio as shown in Equations 2 and 3 if the area of cross-section is the same and with E=75 GPa.

$$L:D=9.874:1 \text{ for circular} \qquad \text{Equation 2}$$

$$L:D=12.34567:1 \text{ for triangle w/}60° \text{ angles} \qquad \text{Equation 3}$$

From Equations 2 and 3, it is shown that the circular bar has a lower performance relating to buckle prevention compared to the triangle with 60° angles or square. Calculation showed that if the triangle form is used instead of the circular form, it will hold 21% more force prior to buckling or, alternatively, the beam or member may be provided approximately 25% longer without changing the diameter.

It should be noted that different materials have different L/D ratios, and therefore it is recommended to recalculate for each type of different material. Using a smaller L/D ratio will reduce the chance of buckling and bending, but conversely, will increase mass. This is an optimization problem. The multidimensional structure 100 has a unique cross section for optimization needs and uses irregular hexagons.

A specific arc pattern was discovered by and is implemented in the multidimensional structure 100. The support arc building depends on the diameter of the bar and its position. The arc changes depending on the connected beam angle as depicted in FIG. 7. The arc is stronger were needed, and smaller in parts that are sufficiently strong. For example, if the angle is closer to 90 degrees the bigger the arc becomes. In the same way, if the angle is smaller than 90 degrees or bigger than 90 degrees—the arc will be smaller. This arc structure is implemented to increase the strength of the connection points and increase the inertia.

Regarding the material selection for the multidimensional structure 100, the primary features that should drive the decision are a material that is simultaneously lightweight and strong, with the ability to deform (bend) rather than breaking. If a brittle material heat treatment is chosen, this will present a worse dynamical load performance.

Ti 6AL 4V alloy with double heat treatment α+β was chosen for testing. Its elongation at break ~8-10%. α+β heat treated this material gives one of the best alloy characteristics needed for the multidimensional structure 100. This mixture provided extended capabilities to stand static and dynamic load, absorb energy, it presented a relatively hard surface and has anti-vibration capabilities. Additionally, this material tended to come back to its original position from displacement after loading with less vibration.

The multidimensional structure 100 can be used in multiple environments. For example, it may be utilized as an interior support structure (i.e., placed in an interior space of an object), or may be utilized as the structure itself (i.e., it is positioned in open space).

Because the multidimensional structure 100 is hollowed in some cases, empty space filling can sometimes be considered. If the multidimensional structure 100 is used in open space, then filling can reduce the performance as filling makes the structure heavier. However, filling works better in closed space when it is compressed. The multidimensional structure 100 has twenty four (24) directions of how it can be compressed, pulled or twisted, and twelve (12) directions of how it can be built. This allows the structure to maintain its symmetry, which is important when it is built to untraditional shape space truss structure. This allows a structure to be built in many differing configurations while utilizing the multidimensional structure 100 to its greatest effect.

Figure 8A:
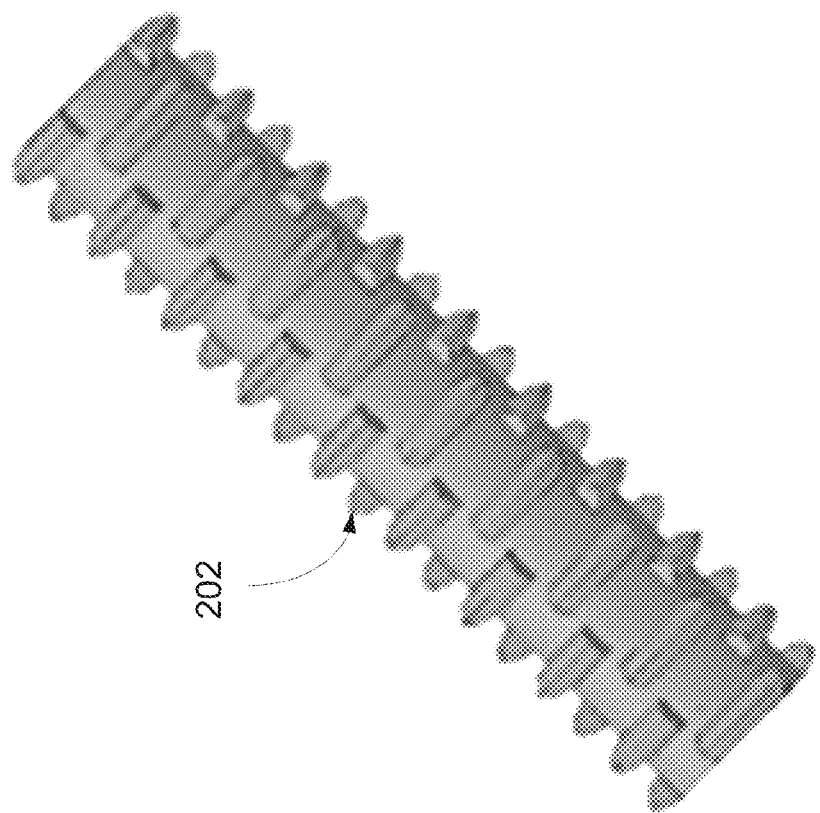

In the case that the multidimensional structure 100 is filled, sliding or movement between filling and structure should be prevented. Accordingly, a device 200 is provided with anti-slide/spin grooves 202 are provided according to FIGS. 8A and 8B showing the device 200 in perspective and cross-section (double material usage) respectively. In particular, the anti-slide/spin grooves 200 are located in at least two different positions on the irregular hexagon shape and the shaper anti-slide edges and 90 degrees anti-spin cuts provide superior anti-slide/spin capabilities.

The recommendation is to look for elongation to break. For example Ti 6AL 4V works well with glass fiber. The inside material should have a lower elongation to break percentage because it will deflect less in bending than the surrounding material as shown in FIGS. 8A and 8B Other material fillings may also be considered as additional reinforcement for the multidimensional structure 100 that improve the performance of the structure. Whether or not to use a filling depends on the application and main material density. If the main material is very dense, then the selection of a foam filling is desirable due to the light weight nature. For closed filling, it is good to use Extrusion of Engineering Plastics (EPP) because it returns to its original form after displacement and it is relatively light weight and strong.

Figure 4:
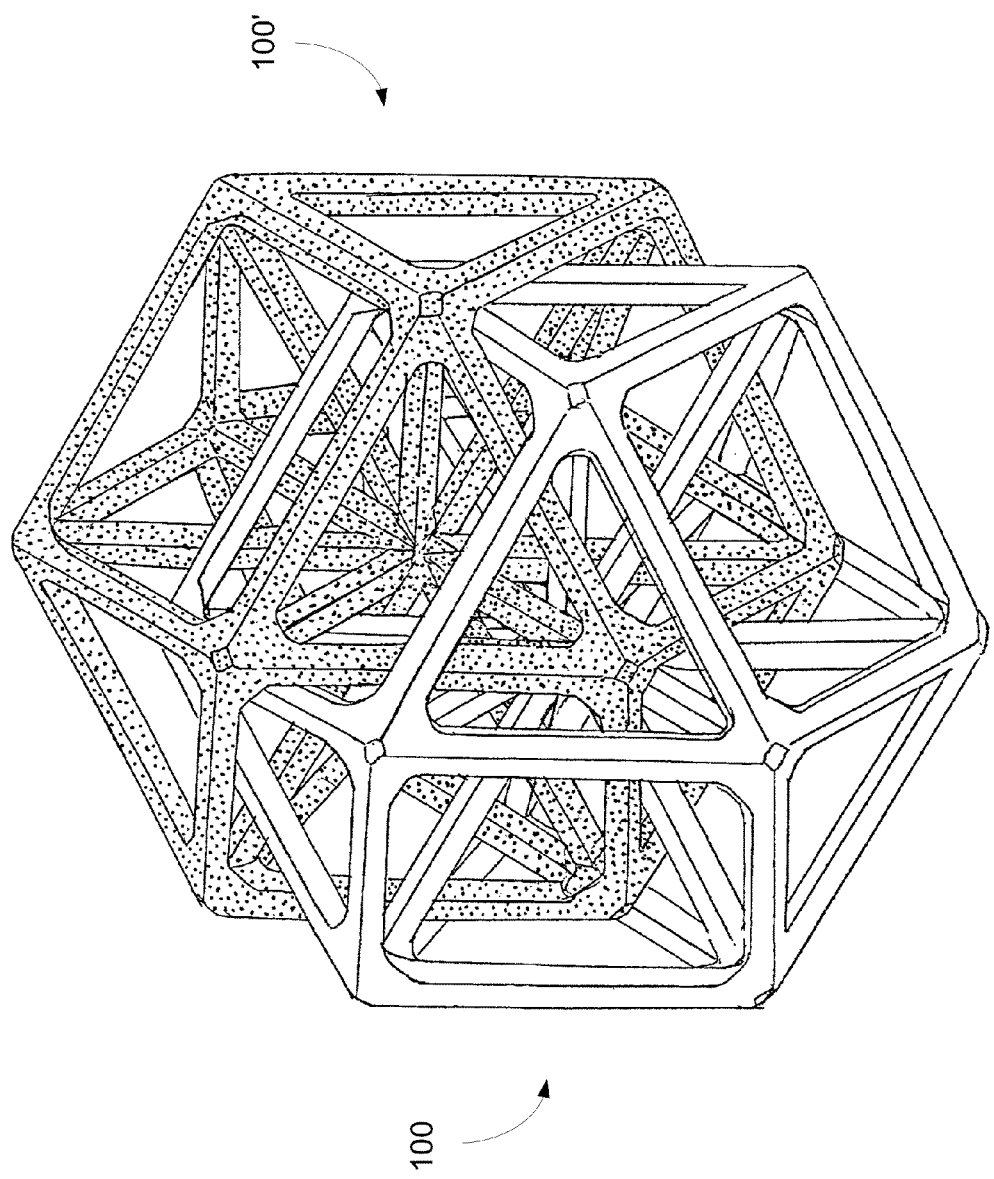
FIG. 4 is an illustration of multiple multidimensional structures according to FIG. 3.
Figure 6:
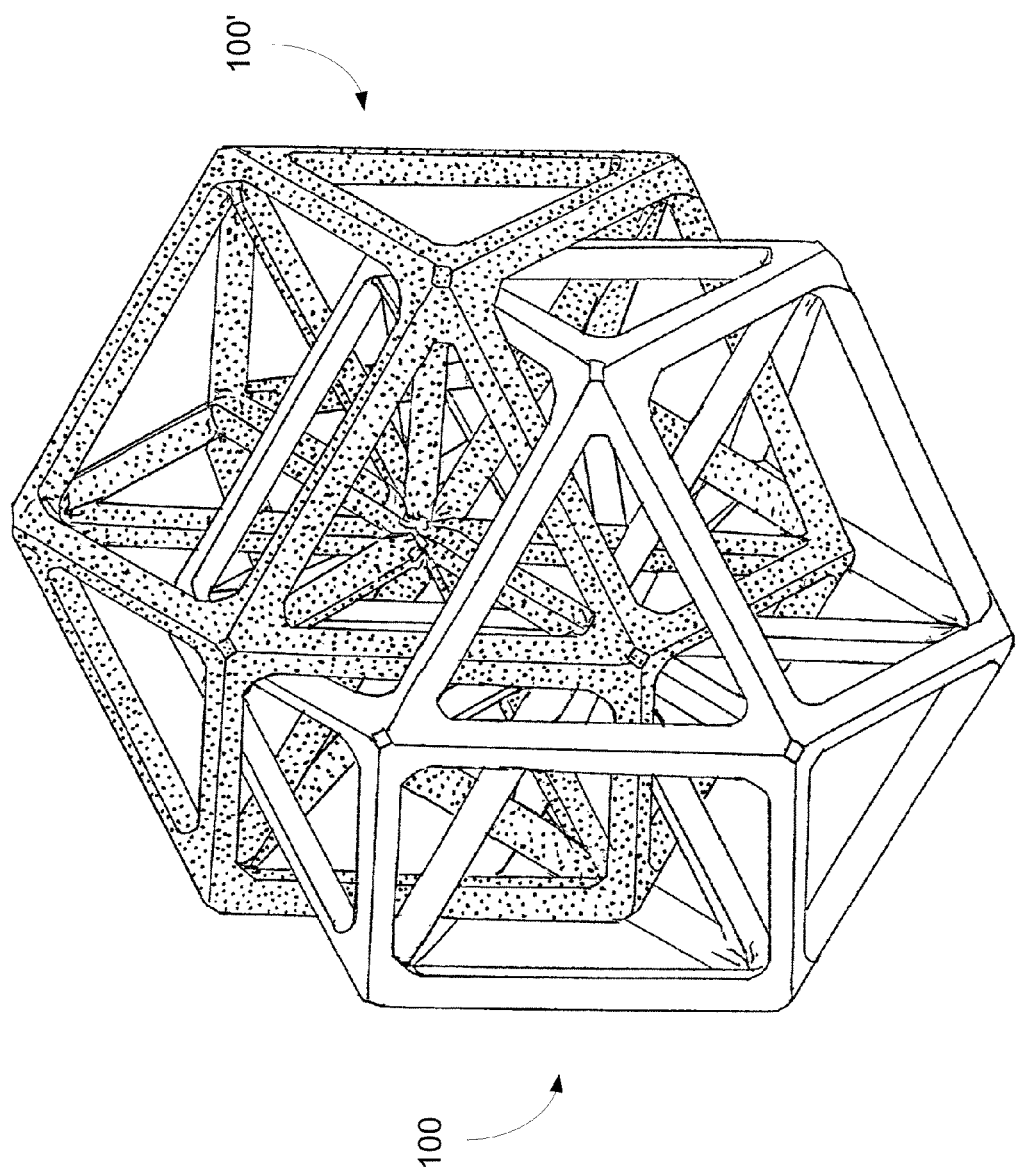
FIG. 6 is an illustration of multiple multidimensional structures according to FIG. 5.
Figure 9:
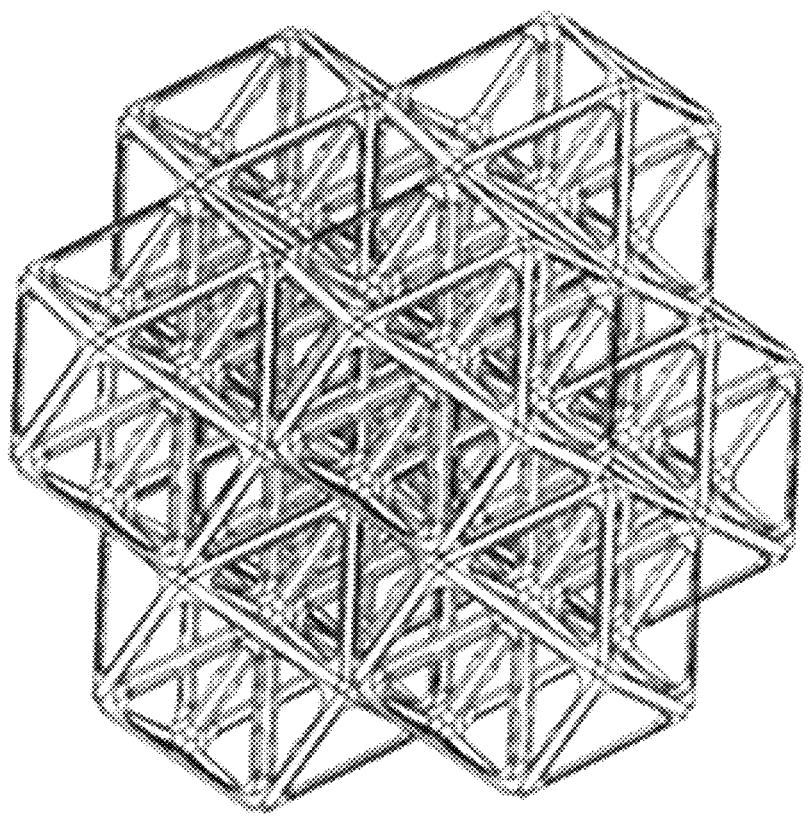
FIGS. 9 and 10 are illustrations of continuous multidimensional structures according to FIG. 3.
Figure 10:
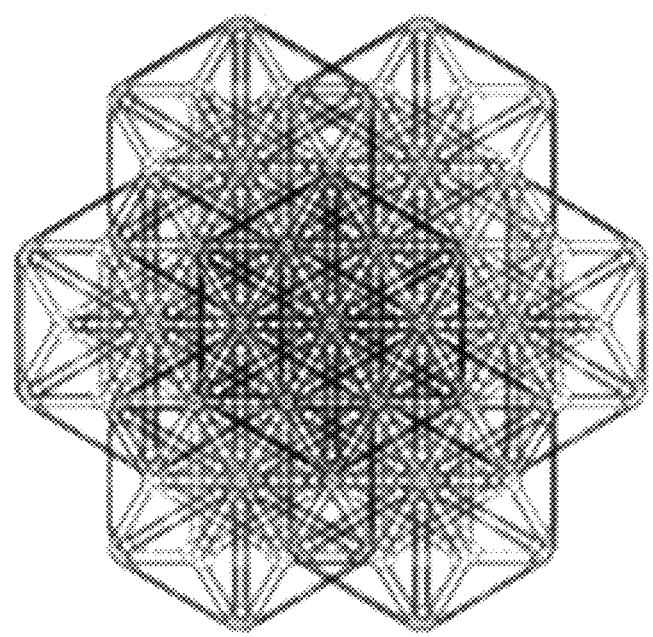

Comparing the multidimensional structure 100 and the EPP—EPP is much weaker and 6 times heavier than the multidimensional structure 100, considering the space that it requires. For reinforcing the multidimensional structure 100 while at the same time maintaining a relatively light weight structure, it is preferable to use a double multidimensional structure 100, 100' as shown in FIGS. 4 & 6, or even a triple multidimensional structure 100, 100', 100" (not illustrated). Still further, a multi piece continuous multidimensional structure 200 (FIGS. 9 & 10) may be provided. In these examples, it can be seen that every connection point is part of 8 tetrahedrons and 6 octahedrons.

If the lightest weight structure is required, such as in aviation applications, even EPP (though relatively light weight) will not be suitable. It would be preferable instead to utilize air pressure to pull or push the surface.

Likewise, while the multidimensional structure 100 is designed and provided to resist shear stress through its structure, it is recommended to distribute shear stress evenly through the entire surface that the multidimensional structure 100 supports to ensure superior performance.

Due to the specific structure of the multidimensional structure 100, there are twelve (12) directions in which the structure may be constructed. This enables wide diversity of structure allowing formation in untraditional spaces while still functioning according to its high capabilities. Depending on application and were the force is applied the structure can be long, short, wide, narrow, tall, small, shrunk or even extended.

If the force is concentrated in a point where the connection includes fewer than twelve (12) beams or members from it, then there should be an additional structure extension built so that the force point will have twelve (12) connection beam elements that are not loose ends, that have not less than eight (8) beams connecting to it.

In still another instance if an applied force is too large, then the strength of the multidimensional structure 100 may be increased by providing a beam diameter that is scaled up and/or Si—$O_2$ silicon oxide filled and unchanged length is needed. That means some specific places of the multidimensional structure 100 can be enhanced. The same system or arraignment works with a double multidimensional structure 100, 100', as long as it is not touching each other and functions individually.

It should be noted that a single body connection for the multidimensional structure 100 is superior.

To enhance the lightweight characteristics of the multidimensional structure 100, the inside of the individual beams or members may be empty or hollow. In one example, an inside cross section of the hollow beam or member may form an arc (e.g., circular). Wall thickness may be determined by the type of force and geometrical shape the beam or member is to enhance. In that way there may be two thickness utilized, with the thinner wall used to enhance the tetrahedron shape and the thicker wall used to enhance the octahedron shape.

The formula used comprises a radius length and the golden ratio number. The hollow beam wall formula is determined as follows:

For tetrahedron:

$$r/phi^3 = \text{wall thickness} \qquad \text{Equation 4}$$

For octahedron and arc enhance:

$$r/phi^2 = \text{wall (5) thickness} \qquad \text{Equation 5}$$

Where "r" is a cross-section radius and "phi" is 1.618.

With respect to the selection of material for the construction of the multidimensional structure 100, the primary considerations are that the material should be relatively lightweight and strong with the ability to bend rather than break. One of skill in the art will recognize that heat treated brittle material will exhibit low dynamic load performance, while non heat treated material will lack static load performance and hardness.

For testing purposes, Ti-6AL-4V alloy with double heat treatment α+β was selected. Due to the heat treated material having a partially crystalline structure, elongation at break was between 8% to 10%. The α+β heat treated Ti-6AL-4V alloy presented some of the best alloy characteristics desirable for the multidimensional structure 100. The mixture gave extended capabilities to withstand static and dynamic loads, for energy absorption, and presented a "hard" surface with good anti-vibration proportions. Additionally, this material tended to come back to its original position from displacement after loading with less vibration due to its semi-crystal structure.

The through the entire structure is unique in that every beam is affected by each other that there is no bar or beam that is left without stress when stress is applied to some point on the structure. Furthermore, the beams are independent from each other in such a manner that they do not form a continuous straight bar line through the structure. If an applied force where allowed to form on a straight beam, the buckling, bending, yielding, twisting and tension, and compression properties of the structure would be negatively impacted. Rather, the multidimensional structure 100 spreads the force through all the beams across the structure.

Vibration is another important aspect of which the multidimensional structure 100 exhibits very good anti-vibration properties. It is important to consider the pitch direction where the multidimensional structure 100 is placed. There are two orientations, one is more dynamically load suitable, and the other is more suited for dealing with static load. The characteristic using at a minimum a single multidimensional structure 100, the maximum difference is 50%. Increasing the number of pieces will reduce the maximum difference.

The following table shows that structure of 20 cm×20 cm×20 cm is relatively strong and rigid without increasing the mass. In this case, the structure of lighter with higher frequency would be superior. While the icosahedrons presents the best mass to frequency ratio of all space truss structures, its application is limited due to the fact that it cannot be continuous.

Testing single piece of the multidimensional structure 100 with Ti-6AL-4V by Finite element analysis.

TABLE 2

| Mode No. | Frequency (Rad/sec) | Frequency (Hertz) | Period (Sec.) |
|---|---|---|---|
| 1 | 9603.9 | 1528.5 | 0.00065423 |
| 2 | 9616.7 | 1530.5 | 0.00065336 |
| 3 | 11171 | 1777.9 | 0.00056245 |
| 4 | 12903 | 2053.6 | 0.00048695 |
| 5 | 15813 | 2516.7 | 0.00039734 |
| 6 | 16150 | 2570.3 | 0.00038906 |
| 7 | 16183 | 2575.6 | 0.00038826 |
| 8 | 17340 | 2759.7 | 0.00036236 |
| 9 | 17383 | 2766.6 | 0.00036146 |
| 10 | 17409 | 2770.7 | 0.00036092 |
| 11 | 17705 | 2817.8 | 0.00035489 |
| 12 | 18986 | 3021.6 | 0.00033095 |

Table 2 shows that this structure presents very good anti-vibration properties.

Diameter Calculation. Best Simplified Smallest Dimensions

| 104,800 N/mm$^2$ | L | 298 mm |
|---|---|---|
| 1050 N/mm$^2$ | P | 1,050 N/mm$^2$ |
| Pct | | 312,799 |
| Critical | | 312,799 |
| Load | | 312,799 |
| Mass | | 1.172 kg |

TABLE 3

| Dia out | 30.18017691 | mm |
|---|---|---|
| Dia in | 23.05516308 | mm |
| Iner out | 40725 | |
| inet in | 13869 | |
| Inetria | 26856 | |
| area out | 715 | mm^2 |
| area in | 417 | mm^2 |
| Area | 298 | mm^2 |

Secondary factors such as tension are also optimized and do not depend on the direction of the load relative to the multidimensional structure 100, because the cross sectional material amount or volume is almost the same through the entire structure.

Figure 11:
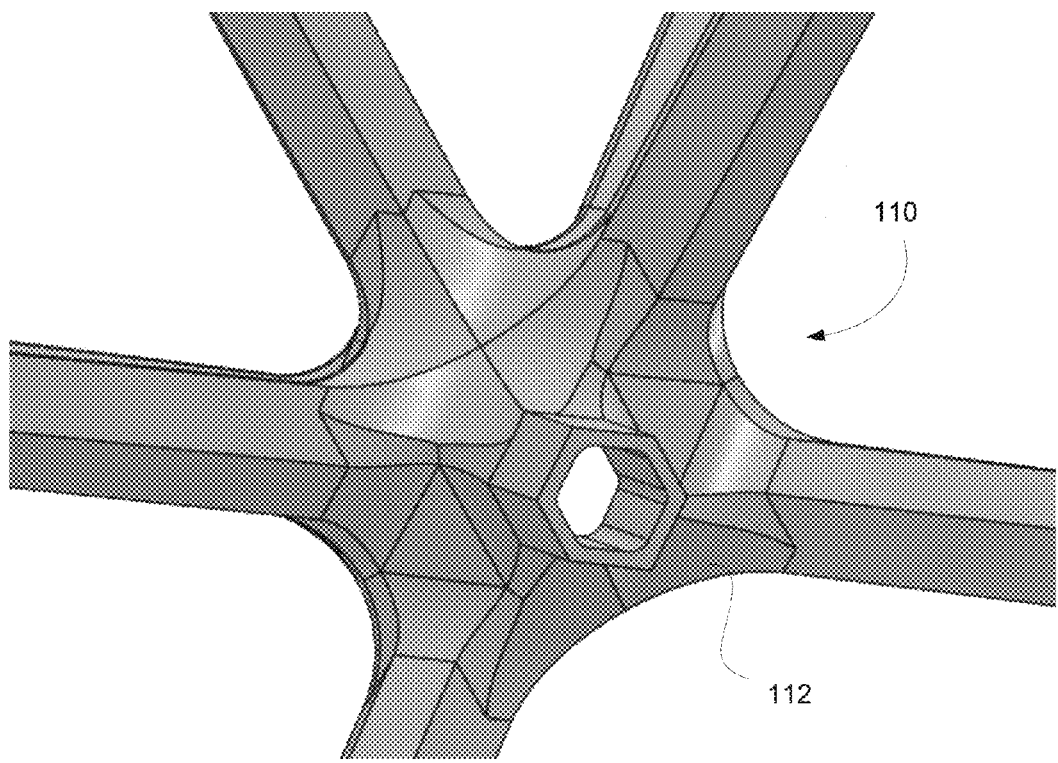
FIG. 11 is an illustration of a center connecting point for the multidimensional structure of FIG. 3.
Figure 12:
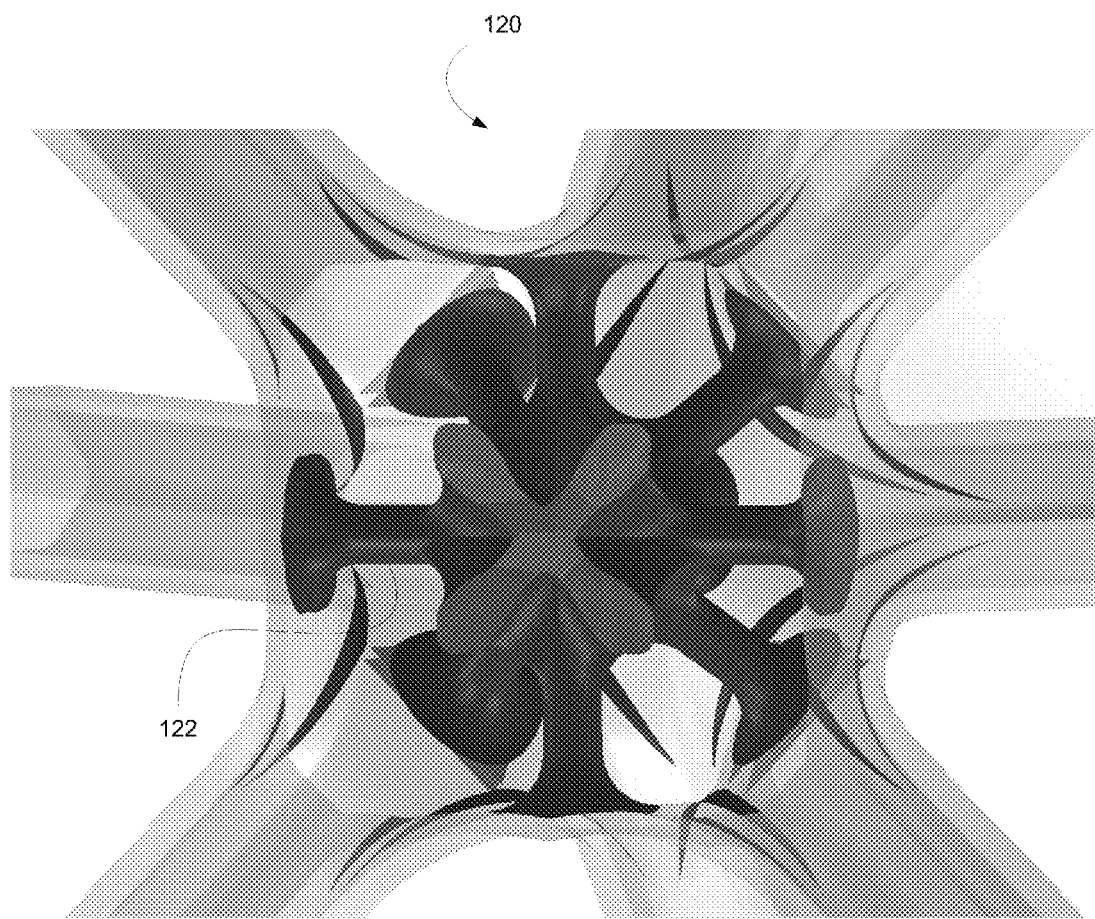
FIG. 12 is an illustration of the interior of the center connecting point according to FIG. 11.

In order to avoid concentrating stress around the connecting points 110 (FIG. 11) of two beams, a fillet 112 is used for the connection points in multidimensional structure 100. The fillets 112 depend on the diameter of the beams and the angle between the connected beams. As can be seen in FIG. 11, the fillets 112 increase in cross section at the end of the beam and therefore, increase the strength at the connection points 110. Also shown in FIG. 12 is an internal support system 120. Rather than increasing the wall thickness, it was determined that it was more effective to apply oblique interconnection beams 122 to increase the strength of the connection points 110. In this type of support arraignment, cross section area moment of inertia has little effect on performance; therefore, it is desirable to use solid beams. To make the beams of the multidimensional structure 100 more effective, the fillets with large radius are used at the intersections of beams and also used to connect beams at the internal connection point as shown in FIG. 12. This relatively light design will function to prevent the connection points from being crushed and increase the FOS of structure.

Figure 13:
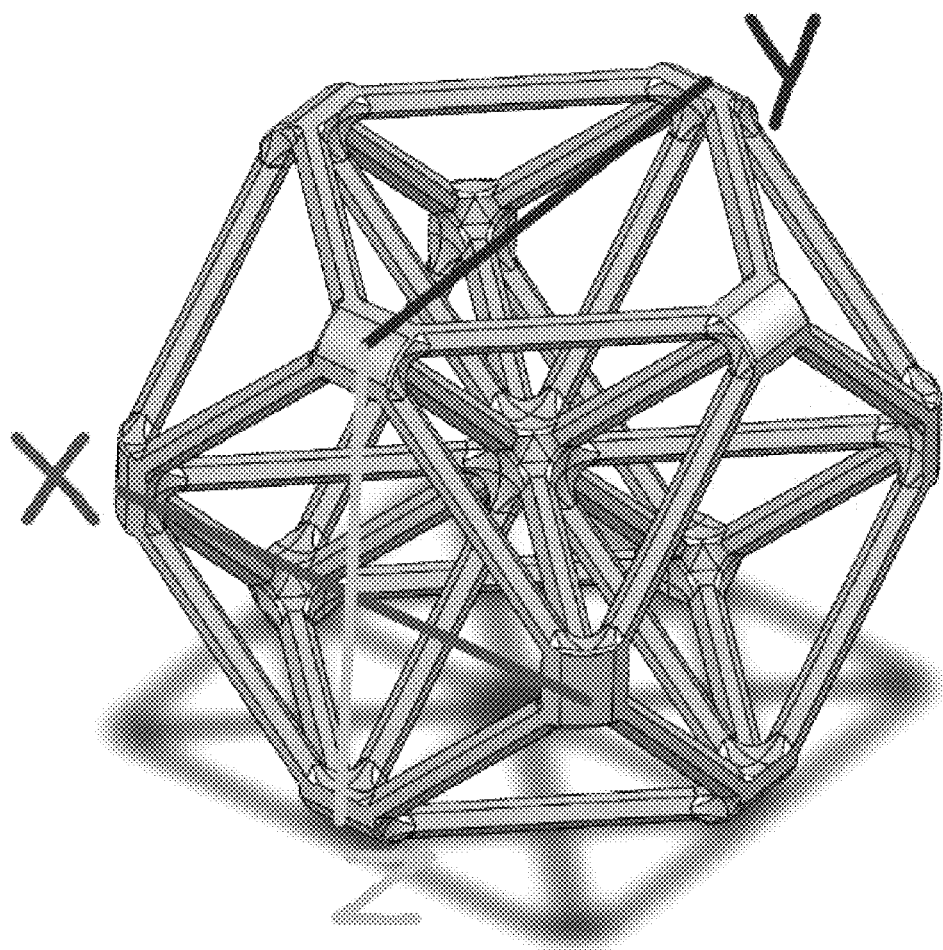
FIGS. 13 and 15 show the multidimensional structure of FIG. 3 upon which a load was exerted, with the results shown in the graph of FIG. 14.

Load Test. The tested multidimensional structure 100 size is x axis 140, y axis 140, z axis 140 mm and is weighted 71.67 grams as shown in FIG. 13. The results of the compression test are presented in FIG. 14.

Figure 14:
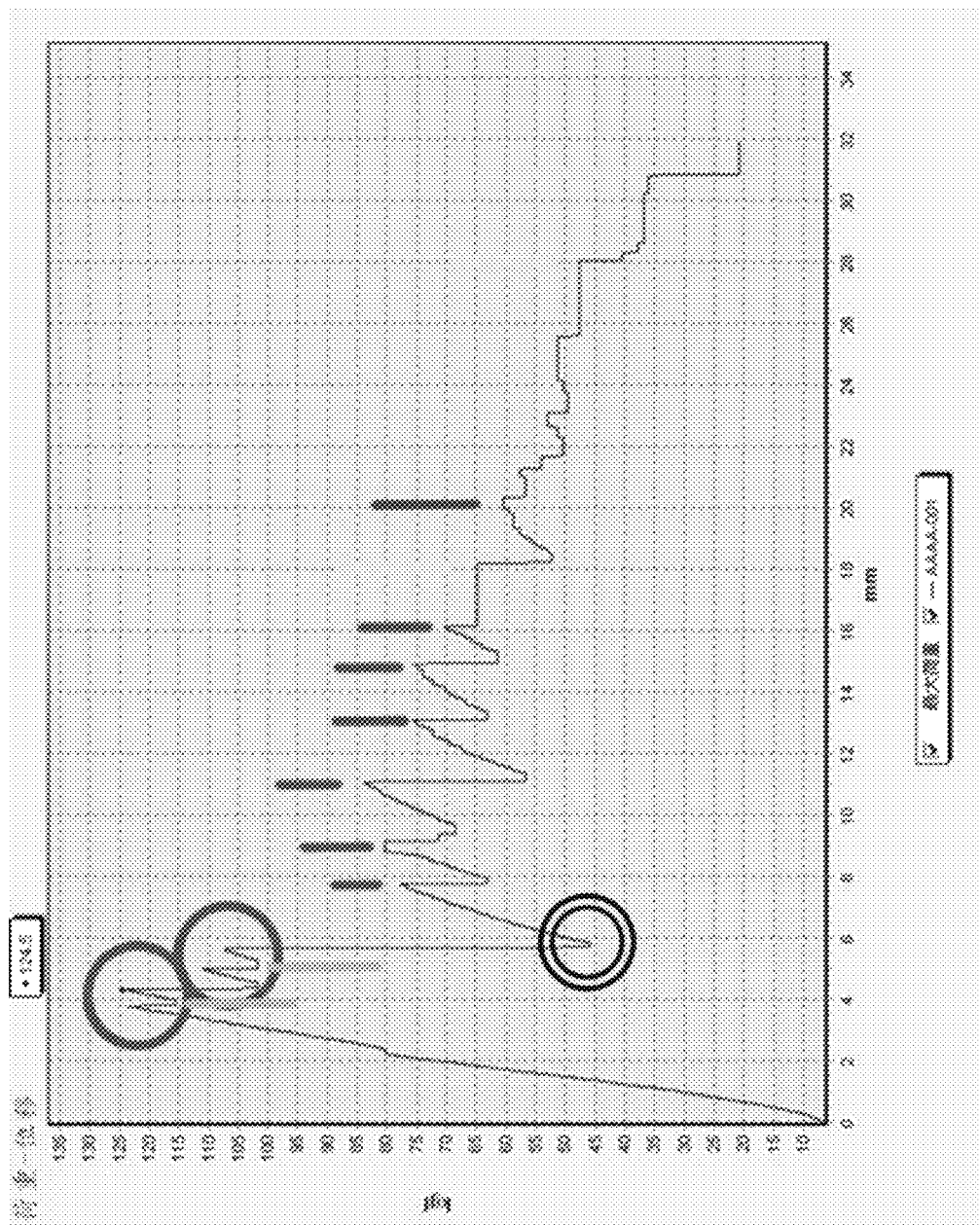

FIG. 14 shows multidimensional structure 100 compression test results (horizontal axis represents kgf and vertical axis represents tenths of mm of displacement). The two circles at the top of the graph and dashed lines (red lines, total of 7 peaks) mark the main breaking points after the structure partly recovers its strength. The dotted lines (green lines, total of 2 extending from below the 2 circles) mark micro fractures. The hidden lines (yellow lines, dash/dot alternating, 3 total point) mark breaking without recovery. The double circle marks breaking of the central connection point.

The strength recovery happens because a single unit of the multidimensional structure 100 is formed by tetrahedrons and square pyramid (half octahedron) structures. Initially, all structures works as one unified structure until the central connection point is broken. After that, all the element structures of Katsuga start to break separately under different displacements of compressed plates. After one of element structures broken, it gives other structures a little bit freedom of movement till it gets stressed, which explains the strength recovery.

Figure 15:
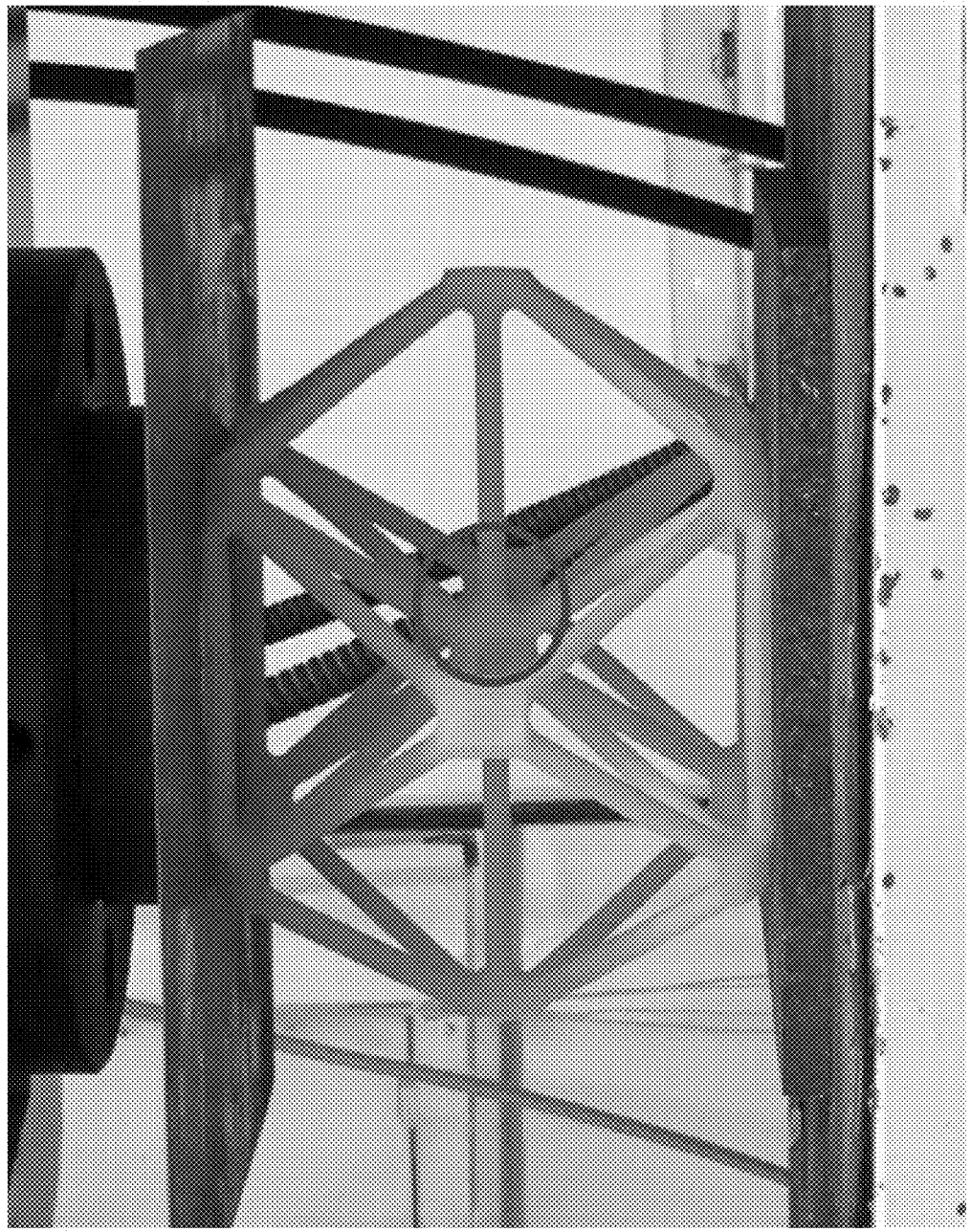

At 53 mm (FIG. 14 horizontal axis marks tenth mm of displacement) displacement, the main structural failure occurs when the central connection point breaks open. Failure was caught by camera as shown in FIG. 15 and also marked in FIG. 14 as the double circle. After that, other structural parts start to break one at a time.

The multidimensional structure 100 however, may be formed of multiple multidimensional structures 100, 100' that are joined together to form a wide lattice. A lattice configuration will be highly resistant to crushing, because every single multidimensional structure 100 will try to expand its middle section outward. The middle parts in turn, will push each other with the same force. Thus, these middle part beams would not easily fail due to tensile force.

Figure 16:
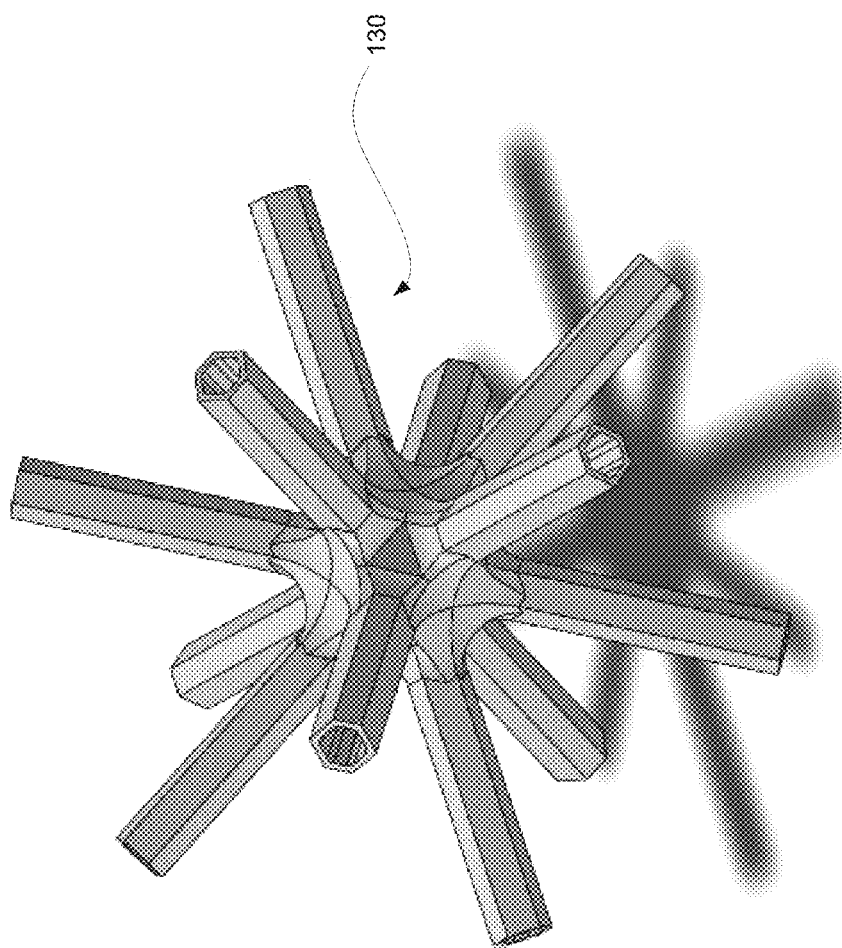
FIG. 16 is an illustration of a connecting point for a lattice configuration for the multidimensional structure of FIG. 3.
Figure 17:
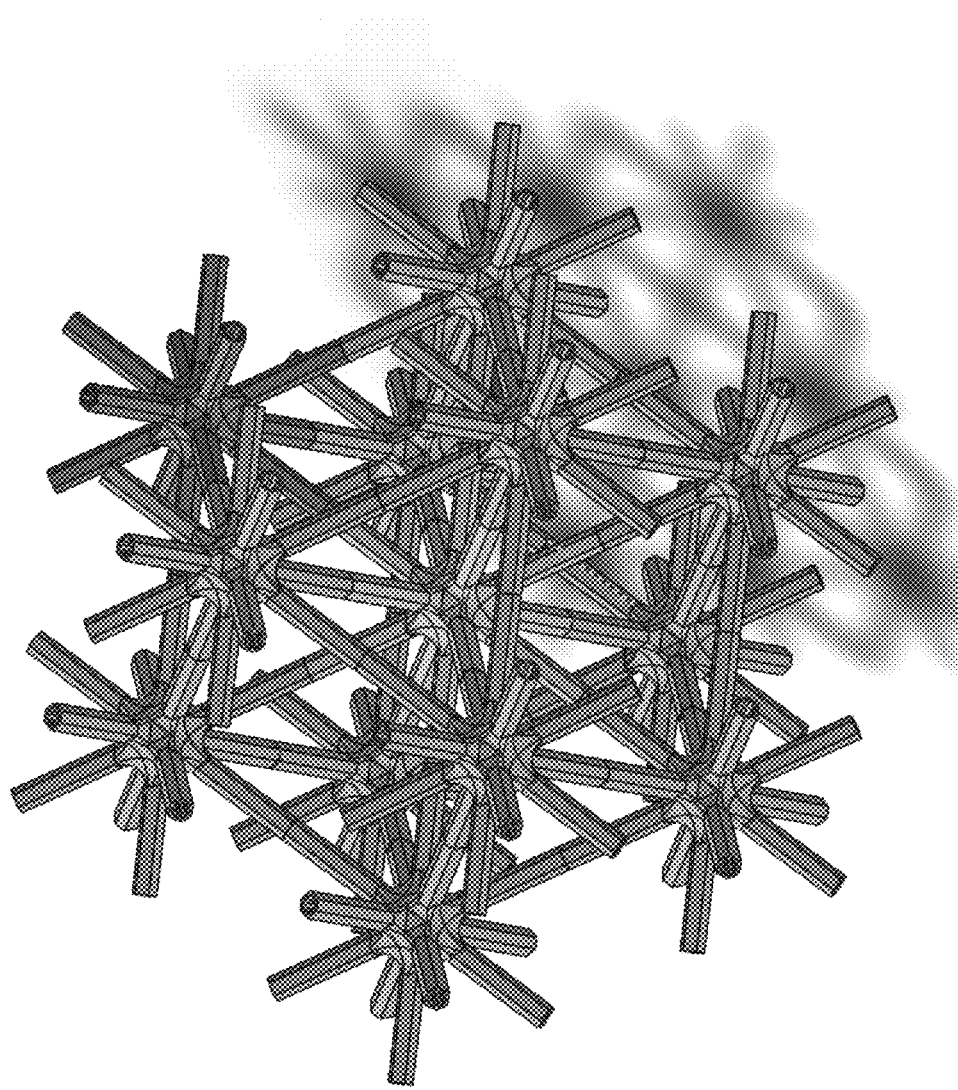
FIGS. 17 and 18 are an illustrations of lattice configurations for the multidimensional structure according to FIG. 16.

The multidimensional structure 100 lattice is made of layers. In the center is the core 130 shown in FIG. 16. When the core 130 of multidimensional structure 100 lattice is surrounded by identical connection points, it is called the first lattice layer which consists of 13 connection points as shown in FIG. 17. When the first layer moves off the redundant beams, it forms back a multidimensional structure 100. If this unit is compressed on octahedron side, all the connection points of 4 middle layers will move outwards.

Figure 18:
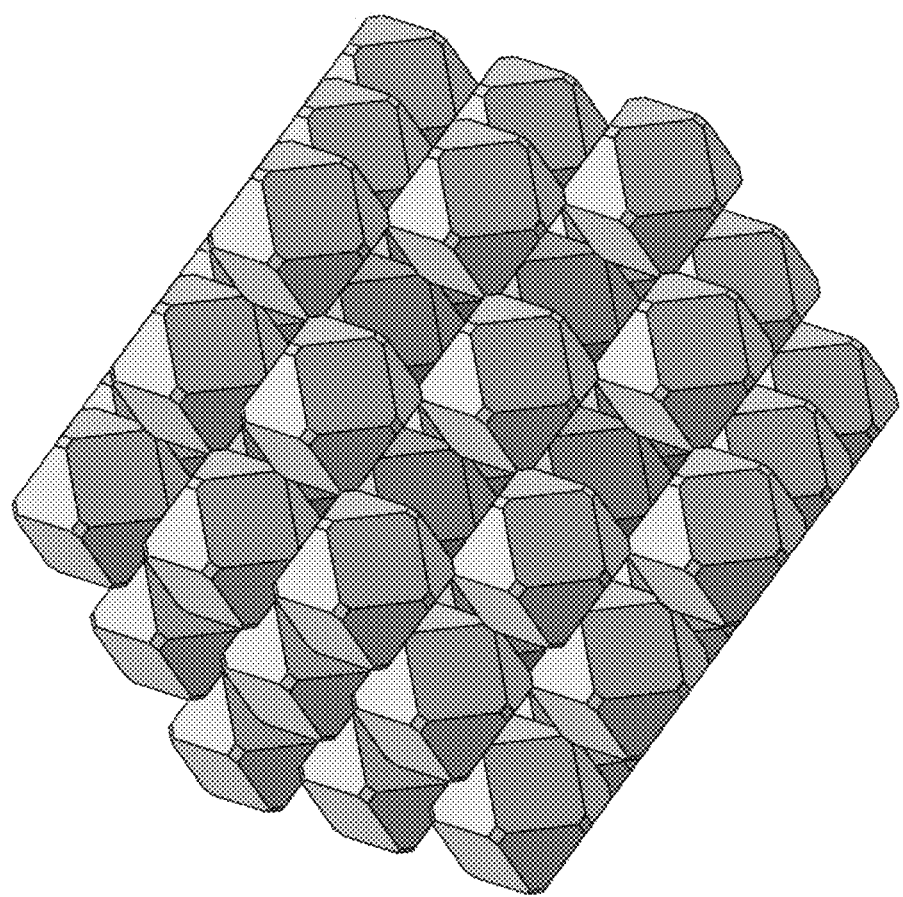

The second multidimensional structure 100 lattice layer is formed in the same way as the first one. It consists of 55 connection points as shown FIG. 18. The middle of second layer will behave differently under compressed loading:

8 Connection points will push against each other
8 Connection points will have limited expansion
4 Connection points have freedom to expand The second layer will substantially enhance the multidimensional structure 100 lattice. When the multidimensional structure 100 is provided with the second layer, it can stand against torsional and shear force. Torsional force should not be applied to the core; it should be applied to first lattice layer. This will increase the critical torsional force more than 9 times.

Although the invention has been described with reference to a particular arrangement of parts, features and the like, these are not intended to exhaust all possible arrangements or features, and indeed many other modifications and variations will be ascertainable to those of skill in the art.

What is claimed is:

1. A multidimensional structure comprising:
    a total of thirty six members each having first and second ends, said members formed as twelve interior members and twenty four exterior members;
    a central connection for joining first ends of the interior members;
    twelve exterior connections, each exterior connection joining second ends of the interior members with ends of four of the exterior members forming the multidimensional structure.

2. The multidimensional structure according to claim 1 wherein said thirty six members are of equal length.

3. The multidimensional structure according to claim 1 wherein each of said thirty six members are provided with an exterior cross section that is non-circular.

4. The multidimensional structure according to claim 3 wherein each of said thirty six members have a hollow cross-section.

5. The multidimensional structure according to claim 4 wherein each of said thirty six members are provided with an interior cross section that comprises an arc such that the cross sectional thickness of the beams varies radially.

6. The multidimensional structure according to claim 5 wherein the multidimensional structure includes eight tetrahedrons and six octahedrons.

7. The multidimensional structure according to claim 6 wherein with respect to said thirty six members, a thinner cross sectional wall is used to enhance the tetrahedron shapes, and a thicker cross sectional wall is used to enhance the octahedron shapes.

8. The multidimensional structure according to claim 7 wherein a total cross-sectional material amount for the multidimensional structure is almost the same throughout the entire structure due to the differences in the cross-sectional thicknesses for the individual members for the tetrahedron and octahedron shapes.

9. The multidimensional structure according to claim 1 wherein said thirty six members are provided with an exterior cross section that is triangular.

10. The multidimensional structure according to claim 1 wherein said multidimensional structure comprises a single-piece continuous structure.

11. The multidimensional structure according to claim 1 wherein said multidimensional structure comprises: Ti 6AL 4V.

12. The multidimensional structure according to claim 1 wherein the central connection comprises a single piece that includes fillets that increase in cross section towards the center of the central connection.

13. The multidimensional structure according to claim 12 wherein the central connection is hollow and comprises supporting beams positioned at oblique angles relative to each other.

14. The multidimensional structure according to claim 12 wherein the multidimensional structure comprises a first multidimensional structure and a second multidimensional structure interconnected with the first multidimensional structure to form a lattice structure.

15. The multidimensional structure according to claim 14 wherein the first multidimensional structure comprises 13 connection points and the second multidimensional structure comprises 55 connection points.

* * * * *